US011769484B2

(12) United States Patent
Ananthapur Bache et al.

(10) Patent No.: US 11,769,484 B2
(45) Date of Patent: Sep. 26, 2023

(54) CHAOS TESTING FOR VOICE ENABLED DEVICES

(71) Applicant: International Business Machines Corporation, Armonk, NY (US)

(72) Inventors: Vijay Kumar Ananthapur Bache, Bangalore (IN); Pradeep Raj Jayarathanasamy, Chennai (IN); Srithar Rajan Thangaraj, Chennai (IN); Arvind Rangarajan, Chennai (IN)

(73) Assignee: International Business Machines Corporation, Armonk, NY (US)

(*) Notice: Subject to any disclaimer, the term of this patent is extended or adjusted under 35 U.S.C. 154(b) by 140 days.

(21) Appl. No.: 17/017,985

(22) Filed: Sep. 11, 2020

(65) Prior Publication Data

US 2022/0084501 A1 Mar. 17, 2022

(51) Int. Cl.
*G10L 15/22* (2006.01)
*G10L 15/01* (2013.01)
(Continued)

(52) U.S. Cl.
CPC .............. *G10L 15/01* (2013.01); *G10L 15/22* (2013.01); *G10L 15/30* (2013.01); *G10L 21/003* (2013.01)

(58) Field of Classification Search
CPC ......... G10L 15/01; G10L 15/22; G10L 15/30; G10L 21/003
(Continued)

(56) References Cited

U.S. PATENT DOCUMENTS 7,562,019 B2    7/2009  Cohen
7,792,281 B1 *  9/2010  Zad-Issa ............... H04M 9/082
                                                       379/406.04
(Continued)

FOREIGN PATENT DOCUMENTS

CN      108538296 A     9/2018
CN      109256115 A     1/2019
(Continued)

OTHER PUBLICATIONS

S. Rawat, P. Gupta and P. Kumar, "Digital life assistant using automated speech recognition," 2014 Innovative Applications of Computational Intelligence on Power, Energy and Controls with their impact on Humanity (CIPECH), 2014, pp. 43-47, doi: 10.1109/CIPECH.2014.7019075. (Year: 2014).*
(Continued)

*Primary Examiner* — Bharatkumar S Shah
(74) *Attorney, Agent, or Firm* — Gilbert Harmon, Jr.

(57) ABSTRACT

Computer-implemented methods, computer program products, and computer systems for testing a voice assistant device may include one or more processors configured for receiving test data from a database, wherein the test data may include a first set of coding parameters and a first user utterance having an expected device response. Further, the one or more processors may be configured for generating a first modified user utterance by applying the first set of coding parameters to the first user utterance, wherein the first modified user utterance is acoustically different than the first user utterance. The one or more processors may be configured for audibly presenting the first modified user utterance to a voice assistant device, receiving a first device response from the voice assistant device, and determining whether the first voice assistant response is substantially similar to the expected device response.

14 Claims, 3 Drawing Sheets

(51) Int. Cl.
*G10L 21/003* (2013.01)
*G10L 15/30* (2013.01)

(58) Field of Classification Search
USPC .......................................................... 704/251
See application file for complete search history.

(56) References Cited

U.S. PATENT DOCUMENTS

| 9,883,026 | B2 | 1/2018 | Aldecoa | |
|---|---|---|---|---|
| 2002/0069064 | A1* | 6/2002 | Dejaco | G10L 15/01 |
| | | | | 704/E15.04 |
| 2005/1978361 | | 9/2005 | Jordan | |
| 2009/0043576 | A1* | 2/2009 | Miller | G10L 15/063 |
| | | | | 704/231 |
| 2016/3528921 | | 12/2016 | Valenzuela | |

FOREIGN PATENT DOCUMENTS

| CN | 110211567 A | | 9/2019 | |
| CN | 111354335 A | | 6/2020 | |
| CN | 111369976 A | | 7/2020 | |
| IN | 201927051483 A | * | 12/2019 | ............ G06F 3/167 |
| WO | 2022052945 A1 | | 3/2022 | |

OTHER PUBLICATIONS

R. Haeb-Umbach et al., "Speech Processing for Digital Home Assistants: Combining Signal Processing With Deep-Learning Techniques," in IEEE Signal Processing Magazine, vol. 36, No. 6, pp. 111-124, Nov. 2019, doi: 10.1109/MSP.2019.2918706. (Year: 2019).*

R. Haeb-Umbach et al., "Speech Processing for Digital Home Assistants: Combining Signal Processing With Deep-Learning Techniques," in IEEE Signal Processing Magazine, vol. 36, No. 6, pp. 111-124, Nov. 2019, doi: 10.1109/MSP.2019.2918706. (Year: 2019) (Year: 2019).*

B. Popović, E. Pakoci, N. Jakovljević, G. Kočiš and D. Pekar, "Voice assistant application for the Serbian language," 2015 23rd Telecommunications Forum Telfor (TELFOR), Belgrade, Serbia, 2015, pp. 858-861, doi: 10.1109/TELFOR.2015.7377600. (Year: 2015).*

Nguyen, "Guide to Automated Voice Apps Testing", LogiGear Magazine, pp. 1-7, <https://www.logigear.com/magazine/test-automation/guide-automated-voice-apps-testing/>.

Thomas, "Addressing the Common Challenges in Voice-First Testing through Automation", eInfochips, May 30, 2019, pp. 1-10, <https://www.einfochips.com/blog/addressing-the-common-challenges-in-voice-first-testing-through-automation/>.

Vatatmaja, "A conversational journey How the three Ts of conversational AI build better voice assistants", Deloitte Insights, Nov. 22, 2019, pp. 1-10, <https://www2.deloitte.com/us/en/insights/focus/cognitive-technologies/testing-training-tuning-voice-assistants.html>.

International Search Report and Written Opinion, International Application No. PCT/CN2021/117146, International Filing Date Sep. 8, 2021.

* cited by examiner

CHAOS TESTING FOR VOICE ENABLED DEVICES

BACKGROUND OF THE INVENTION

The present invention relates generally to the field of device testing, and more particularly to testing a voice enabled device using machine learning techniques.

Interactive voice assistants are enabled to detect voice commands, process the voice commands, and determine the user's intent to perform a certain task. Voice assistant devices interact with users and evolve to conduct continuous conversations with users. Voice assistants have become a primary interface for systems for virtual assistants.

However, voice assistant devices may be hampered with noisy environments, which makes it more challenging to determine the accurate meaning of a voice command or a user utterance. Further, voice assistants are not tested with varying degrees of voice types and modulations, making it difficult for voice assistant devices to discern naturally modulated words or phrases from standard words or phrases that were used during testing.

SUMMARY

Embodiments of the present invention disclose a computer-implemented method, a computer program product, and a system for testing a voice assistant device. The computer-implemented method for testing a voice assistant device may include one or more processors configured for receiving test data from a database, the test data comprising a first set of coding parameters and a first user utterance having an expected device response. The one or more processors may also be configured for generating a first modified user utterance by applying the first set of coding parameters to the first user utterance, wherein the first modified user utterance is acoustically different than the first user utterance.

The one or more processors may also be configured for audibly presenting the first modified user utterance to a voice assistant device and receiving a first voice assistant response from the voice assistant device, wherein the first voice assistant response is responsive to the first modified user utterance. The first modified user utterance may be audibly presented to the voice assistant device by outputting a first audio signal via a speaker communicatively connected to the one or more processors, wherein the first voice assistant response received from the voice assistant device may be detected by a microphone communicatively connected to the one or more processors as a second audio signal. Further, the one or more processors may also be configured for determining whether the first voice assistant response is substantially similar to the expected device response.

Responsive to determining the first voice assistant response is substantially similar to the first expected device response, the one or more processors may be configured for ceasing to receive additional test data. Further, responsive to determining the first voice assistant response is not substantially similar to the expected device response, the one or more processors may be configured for identifying a first edge case based at least on the first set of coding parameters and the first modified user utterance.

Even further, the computer-implemented method for testing a voice assistant device may include one or more processors configured for determining a second set of coding parameters based on at least one of the first set of coding parameters, the first modified user utterance, and the first edge case. The one or more processors may be further configured for generating a second modified user utterance by applying the second set of coding parameters to the first user utterance, wherein the second modified user utterance is acoustically different than the first user utterance and the first modified user utterance. The one or more processors may further be configured for audibly presenting the second modified user utterance to the voice assistant device, receiving a second voice assistant response, determining whether the second voice assistant response is substantially similar to the expected device response. Furthermore, responsive to determining the second voice assistant response is substantially similar to the expected device response, the one or more processors may be configured for ceasing to receive additional test data comprising the first user utterance.

DETAILED DESCRIPTION

Consumer experiences are growing to newer levels each day. At the forefront is the interactive voice assistant. Various Artificial Intelligence ("AI") systems and Voice Assistant ("VA") systems are currently available in the market. As any other product, VA technology is continuously improving as breakthroughs in voice recognition and supporting software are achieved. VA devices are able to interact with users and are evolving to simulate human responses in having continuous conversations. VA devices have become a primary interface for the systems that utilize VAs developed by various technology companies.

One of the biggest challenges VA systems encounter is operating in a noisy environment and competing with other ambient sounds. While there have been numerous research studies done to identify the right voice, VA systems still fail to authenticate users if there is a noise or some modulation in voices. As VA applications are being implemented in enterprise systems, enabling VA device response accuracy becomes more and more complex, which in turn further complicates testing those systems making the testing of VA systems a huge task. Inadequate testing leads to VA systems that are prone to lots of errors, making the user experience miserable when VA applications fail. There is a clear need to enhance the user experience of VA devices and systems as their user base expands.

Embodiments of the present invention recognize that VA devices should be tested in numerous environments including varying types and levels of noise to increase the VA device response accuracy. Additionally, VA devices are tested to identify edge cases that indicate specific modulations to a user utterance sufficient to render the VA device incapable of understanding the user utterance. Once the edge cases are identified, test data used to modulate the user utterance that resulted in the edge case can be saved and associated with conditions that made the user utterance unidentifiable. Also, test data associated with edge cases may be fine-tuned to modulate user utterances, wherein the fine-tuning would be just enough to avoid the edge case in a subsequent testing iteration. By fine-tuning the test data, particularly fine-tuning coding parameters (e.g., vocoder parameters), the VA device becomes better conditioned to identify background noise and voice modulations in order to ignore the background noise and voice modulations to properly identify a command or question in the user utterance. Furthermore, VA devices should also be tested with varying types of user utterances audibly outputting the same command or phrase to increase the VA device response accuracy. Implementation of embodiments of the invention may take a variety of forms, and exemplary implementation details are discussed subsequently with reference to the Figures.

Figure 1:
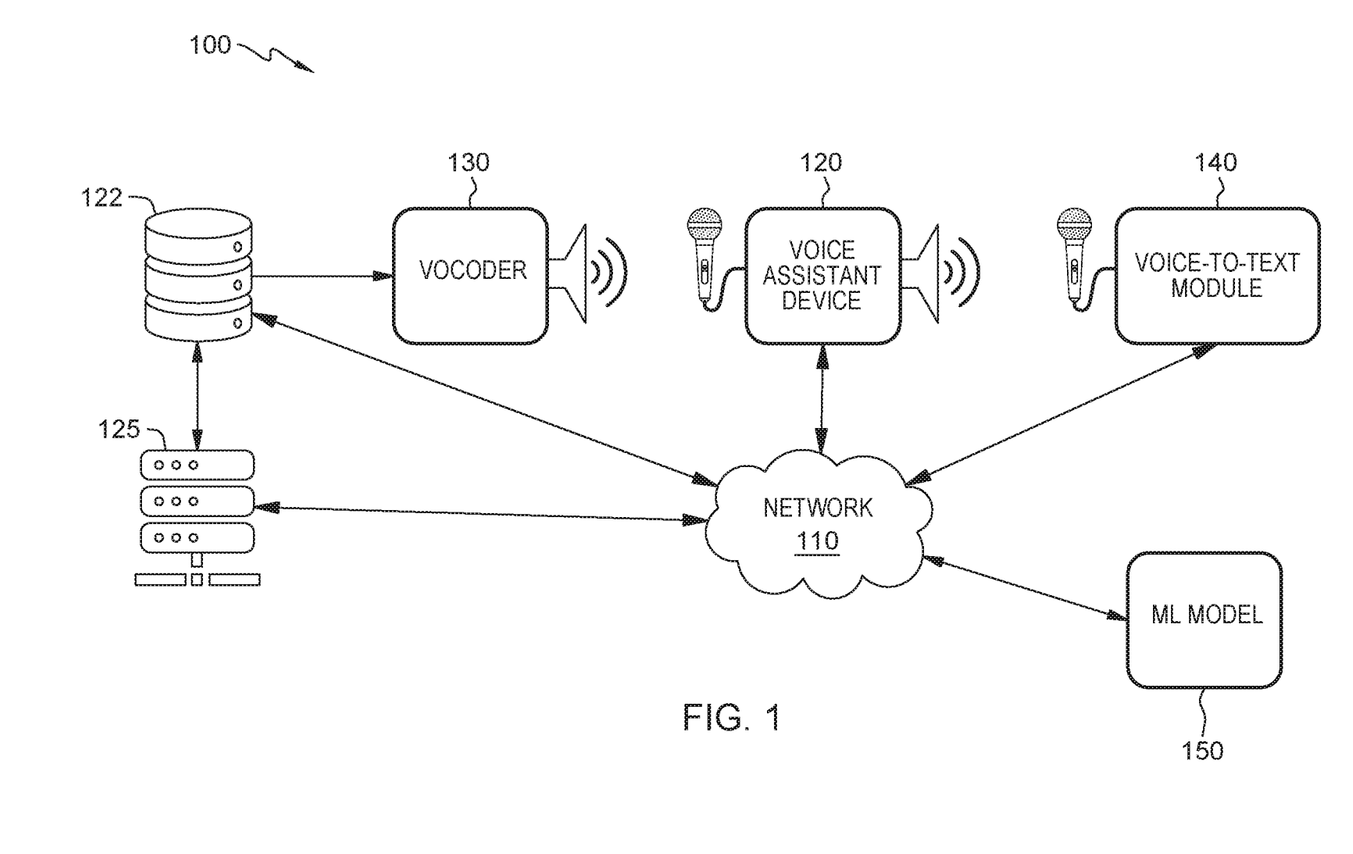
FIG. 1 is a functional block diagram illustrating a distributed data processing environment for testing a voice assistant device, in accordance with an embodiment of the present invention.

FIG. 1 is a functional block diagram illustrating a distributed data processing environment for testing a voice assistant device, generally designated 100, in accordance with one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

In the depicted embodiment, distributed data processing environment 100 includes voice assistant device 120, server 125, database 122, voice-to-text module 140, and machine learning "ML" model 150 interconnected via network 110. Distributed data processing environment 100 may include database 122 configured to store data received from, and transmit data to, components (e.g., voice assistant device 120, vocoder 130, voice-to-text "VTT" module 140, and/or ML model 150) within distributed data processing environment 100 for testing a voice assistant device. Distributed data processing environment 100 may also include additional servers, computers, sensors, or other devices not shown. Each component (e.g., voice assistant device 120, vocoder 130, voice-to-text "VTT" module 140, and/or ML model 150) may be configured to communicate data among each other independent of network 110.

Network 110 operates as a computing network that can be, for example, a local area network (LAN), a wide area network (WAN), or a combination of the two, and can include wired, wireless, or fiber optic connections. In general, network 110 can be any combination of connections and protocols that will support communications between voice assistant device 120, server 125, database 122, VTT module 140, and ML model 150.

Voice assistant device 120 operates to operate as a voice assistant device for responding to user prompts. In an embodiment, voice assistant device 120 may be configured to receive or detect voice data from vocoder 130, process the voice data, and output an acoustic signal including a voice assistant response corresponding to the voice data. Voice assistant device 120 may be configured to send and/or receive data from network 110 or via other system components within distributed data processing environment 100. In some embodiments, voice assistant device 120 may be a laptop computer, tablet computer, netbook computer, personal computer (PC), a desktop computer, a smart phone, smart speaker, virtual assistant, voice command device or any programmable electronic device capable of receiving or detecting audible inputs, processing the audible inputs, and audibly outputting an associated response. Voice assistant device 120 may include components as described in further detail in FIG. 3.

Database 122 may be configured to operate as a repository for data flowing to and from network 110 and other connected components. Examples of data include test data, device data, network data, data corresponding to user utterances processed by the vocoder, coding parameters, vocoder parameters, data corresponding to modified user utterances, and data corresponding to voice assistant responses. A database is an organized collection of data. Database 122 can be implemented with any type of storage device capable of storing data and configuration files that can be accessed and utilized by server 125 and/or voice assistant device 120, such as a database server, a hard disk drive, or a flash memory. In an embodiment, database 122 may be accessed by vocoder 130, voice assistant device 120, server 125, voice-to-text module 140, and/or ML model 150, via network 110 or independent of network 110, to store and receive data corresponding to a testing regimen performed on voice assistant device 120. For example, test data may be received and stored in database 122 and transmitted to vocoder 130 or other components connected to network 110 as desired by the testing regimen. In another embodiment, database 122 may be accessed by server 125 and/or ML model 150 to access user data, device data, network data or other data associated with the testing regimen. Database 122 may also be accessed by VTT module 140 to store data corresponding to test result data processed and generated by voice assistant device 120 and VTT module 140. In another embodiment, database 122 may reside elsewhere within distributed network environment 100 provided database 122 have access to network 110.

Test data may include data compatible with JavaScript Object Notation ("JSON") data-interchange format and voice commands data. Test data may also include data corresponding to text-to-voice conversations between a user and another party. For example, test data may include audible user utterances as voice sounds spoken by a user. The user utterances may include commands to perform a specific task or function. The user utterances may also include questions posed by the user to solicit a response from the virtual assistant executing as part of the VA device's 120 operations. Test data may also include coding parameters (e.g., vocoder parameters) and values for performing tests on VA device 120. For example, test data may be provided to database 122 via an external source or received from one or more of the components in communication with database 122. In particular, voice commands may include a trigger word/phrase followed by "How is the weather outside," "Is it going to rain" and the expected device responses may be "Hello AB", "It's 25 degrees, and it is sunny," and "Yes, there are chances of rain," respectively.

Server 125 can be a standalone computing device, a management server, a web server, or any other electronic device or computing system capable of receiving, sending, and processing data and capable of communicating with voice assistant device 120 via network 110. In other embodiments, server 125 represents a server computing system utilizing multiple computers as a server system, such as a cloud computing environment. In yet other embodiments, server 125 represents a computing system utilizing clustered computers and components (e.g., database server computers, application server computers, etc.) that act as a single pool of seamless resources when accessed within distributed data processing environment 100. Server 125 may include components as described in further detail in FIG. 3.

Vocoder 130 may be a voice codec or voice processor configured to analyze and synthesize an input human voice signal for audio data compression, multiplexing, voice encryption, or voice transformation. Vocoder 130 may include several filter bands, tuned across the audio spectrum. Vocoder 130 may be configured to generate voice textures using vocoder parameters. Vocoder parameters are a type of coding parameters used to program vocoder 130 to manipulate audio signals received according to the number of units that are measurable for the vocoder parameters. Vocoder 130 may be configured to receive test data, process the test data by applying vocoder parameters to a user utterance in the test data, and output a modified user utterance that may be acoustically different than the received user utterance in the test data.

Vocoder 130 may also be configured to generate multiple variations of voices or user utterances based on the vocoder parameters and values provided in the test data. A received user utterance may be modulated or modified by applying the vocoder parameters, background noise, or an accent to change the user utterance characteristics. For example, Fliger distortion techniques or other known audio signal processing techniques may be used to modulate the user utterances in the test data so that the modulated or modified user utterances sound acoustically difference that the received user utterance. Further, vocoder 130 may receive test data including a user utterance corresponding to a voice command or a voice question to a virtual assistant executing via a voice assistant device 120, wherein the virtual assistant may be configured to provide an expected device response.

In another embodiment, vocoder 130 may be configured to add noise data to the vocoder parameters to be applied to the user utterance. Vocoder 130 may also be configured to add noise data directly to the user utterance, so that when the modified user utterance is presented to voice assistant device 120, the modified user utterance would include the noise data as part of the output audio signal. Thus, coding parameters may include noise data. For example, one or more noise signatures may be added to a user utterance to simulate a real-world environment that includes ambient noise in the background. Noise data may include sounds produced by background TV audio, background conversations between people, nature (e.g., animals, weather) sounds, transportation (e.g., public or private vehicles/modes of transport), or any other sounds that may be detected by a microphone that exist within an ambient environment.

The user utterance may include voice characteristics based on user characteristics that uniquely distinguish one user's voice from another user's voice. For instance, the voice characteristics may include pitch, speech rate, tone, texture, intonation, loudness, etc., wherein the combination of one or more of the voice characteristics may result in a unique voice corresponding to an accent or a dialect.

The voice command may be any command in the user utterance that is one of a plurality of commands that voice assistant device 120 is configured to process, wherein upon processing the voice command, voice assistant device 120 may be configured to perform a function or utter an expected device response. The expected device response may include voice assistant device 120 performing the function corresponding to the command or question in the user utterance.

For example, the voice command may include the command to "set an alarm for 6 o'clock AM", which when processed and executed by voice assistant device 120, generates an expected device response audibly presenting "alarm set for 6 o'clock AM." In addition to generating the expected device response, voice assistant device 120 may be configured to execute the voice command and perform the function included in the voice command.

However, voice assistant device 120 may not be sufficiently configured to understand the voice command due to various factors including an unfamiliar accent/dialect or background noise, resulting in an edge case. According to this invention, an edge case occurs when voice assistant device 120 receives and processes test data including a modified user utterance and generates a voice assistant response that is not a match with the corresponding expected device response. Further, an edge case may occur when voice assistant device 120 receives and processes test data including a modified user utterance and fails to generate a voice assistant response or generates an error message indicating that voice assistant device 120 failed to process the modified user utterance.

Therefore, in an embodiment, vocoder 130 may be configured to receive test data comprising vocoder parameters, which when applied to a user utterance in the test data, generates and audibly presents a modified user utterance to voice assistant device 120. Upon processing and executing the modified user utterance, voice assistant device 120 may be configured to audibly present a device response that may or may not substantially match the expected device response corresponding to the user utterance. If the voice assistant device 120 presents a device response that does not substantially match the expected device response, then an edge case may be identified based on the test data used to produce modified user utterance.

Voice-to-text module 140 may be a component configured to perform speech recognition processes, wherein speech data is received and processed to output a text data corresponding to the received speech data. For example, voice-to-text module 140 may be configured to receive an audio signal including speech data from voice assistant device 120, process the audio signal and output text data corresponding to the received audio signal. The output text data may be included in the test result data transmitted to database 122. Further, voice-to-text module 140 may be configured to capture the voice audio signal and convert the voice audio signal to text data. Voice-to-text module 140 may be further configured to compare the text data corresponding to the actual voice assistant response, to test data corresponding to the expected device response to determine if there is a match. The test result data may be captured and stored in database 122. The test result data may include data corresponding to a voice assistant response captured from voice assistant device 120. The test result data may also include the vocoder parameters and the number of units for each of the vocoder parameters used to modulate user utterances in the test data.

The number of units for a vocoder parameter corresponds to a quantifiable unit of measure for each parameter. For example, vocoder parameters may include number of bands, frequency range, envelope, unvoiced elements, formant shift, bandwidth, etc. Each parameter may be quantified by a number of units to be applied to the corresponding parameter. For instance, the number of bands determined the total number of filter bands that are applied to a user utterance as a voice signal. A lower number (e.g., in the 4 to 6 range) delivers a vintage sound, while anything higher than 16 bands offers more detail, often at the expense of processor utilization. The frequency range vocoder parameter can be set with an upper limit and a lower limit, which can be divided across the number of bands available. Frequency range vocoder parameters may be used to tune filter bands in vocoder 130 to accommodate higher or lower vocal ranges of female and male voices, respectively. Envelope vocoder parameters determine how quickly the effect responds to dynamic volume changes, which when applied to vocals or user utterances, the envelope vocoder parameters provide fairly quick response times, but longer response times are achieved for more impression effects.

Additional vocoder parameters may be associated with frequency filters (e.g., highpass, lowpass) that may help improve intelligibility for certain voice elements. For example, a highpass filter vocoder parameter may improve intelligibility when plosives (e.g., the letters t, d, b) and sibilants (e.g., s, z, x) are processed by vocoder 130 by allowing these unvoiced elements to be better detected and identified.

Machine learning ("ML") model 150 may include one or more processors configured for receiving test result data, processing the received test result data, and generating output data corresponding to the received test result data. For example, ML model 150 may be configured to receive test result data from database 122, process the test result data to generate modified vocoder parameters, and update the test data based on the edge case, i.e., received test data. In other words, ML model 150 may be configured to fine tune the vocoder parameters based on the test result data to generate new test data to further test voice assistant device 120 to identify more edge cases. If more edge cases are identified, then ML model 150 may be better configured to generate fine-tuned vocoder parameters to modulate user utterances to generate modified user utterances that will result in the expected device responses from voice assistant device 120.

Further, in another embodiment, ML model 150 may be configured to apply the principles of chaos engineering to test for resilience, wherein ML model 150 may compare test results to identify edge cases and fine-tune the vocoder parameters to identify more edge cases within preset control limits. For example, if the actual voice assistant response does not match the expected device response, then ML model 150 may determine that the failure to match constitutes an edge case and identify the modified test data as an edge case. Once an edge case is identified, ML model 150 may be configured to modify first vocoder parameters used in the edge case to generate second vocoder parameters to be applied, by vocoder 130, to the user utterance to generate another modified user utterance for additional testing on voice assistant device 120. ML model 150 may be configured to continue the vocoder parameters fine-tuning process until sufficient edges cases have been identified to satisfy the control limits of the testing process. Once an edge case has been identified, ML model 150 may be configured to correct or fine-tune the vocoder parameters corresponding to the identified edge case. The corrected or fine-tuned vocoder parameters may then be applied to the user utterance to produce or generate modified user utterances for presentation to VA device 120 for further testing. VA device 120 testing may continue through a number of iterations that are sufficient to satisfy a condition associated with a successful testing regimen. For example, VA device 120 testing may continue until a device response substantially matches the expected device response corresponding to the user utterance processed by vocoder 120 and presented to VA device 120 as a modified user utterance.

A condition may be satisfied once sufficient testing iterations have been completed. For example, a condition may correspond to a determination that the number of edge cases exceeds or fall short of a predetermined threshold. For example, after 3 iterations of fine-tuning the vocoder parameters identified with edge cases, one or more processors may be configured to stop or cease sending test data to vocoder 130, signaling the end of a phase of the testing regimen. The number of testing iterations may be based on VA device processing time, which is the amount of time it takes for VA device 120 to process user utterances and modified user utterances. The number of testing iterations may also be based on the number of edge cases identified, wherein a predetermined number of edge cases identified may satisfy a condition to stop sending test data to vocoder 130. Also, testing personnel may manually cease the process of providing test data to VA device 120.

In at least some embodiments, ML model 150 may implement a trained component or trained model configured to perform the processes described above with respect to ML model 150. The trained component may include one or more machine learning models, including but not limited to, one or more classifiers, one or more neural networks, one or more probabilistic graphs, one or more decision trees, and others. In other embodiments, the trained component may include a rules-based engine, one or more statistical-based algorithms, one or more mapping functions or other types of functions/algorithms to determine whether a natural language input is a complex or non-complex natural language input. In some embodiments, the trained component may be configured to perform binary classification, where the natural language input may be classified into one of two classes/categories. In some embodiments, the trained component may be configured to perform multiclass or multinomial classification, where the natural language input may be classified into one of three or more classes/categories. In some embodiments, the trained component may be configured to perform multi-label classification, where the natural language input may be associated with more than one class/category. The one or more processors may include ML model 150, as described herein.

Various machine learning techniques may be used to train and operate trained components to perform various processes described herein. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score"

indicating which category the data most closely matches. The score may provide an indication of how closely the data matches the category.

In order to apply the machine learning techniques, the machine learning processes themselves need to be trained. Training a machine learning component requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 2:
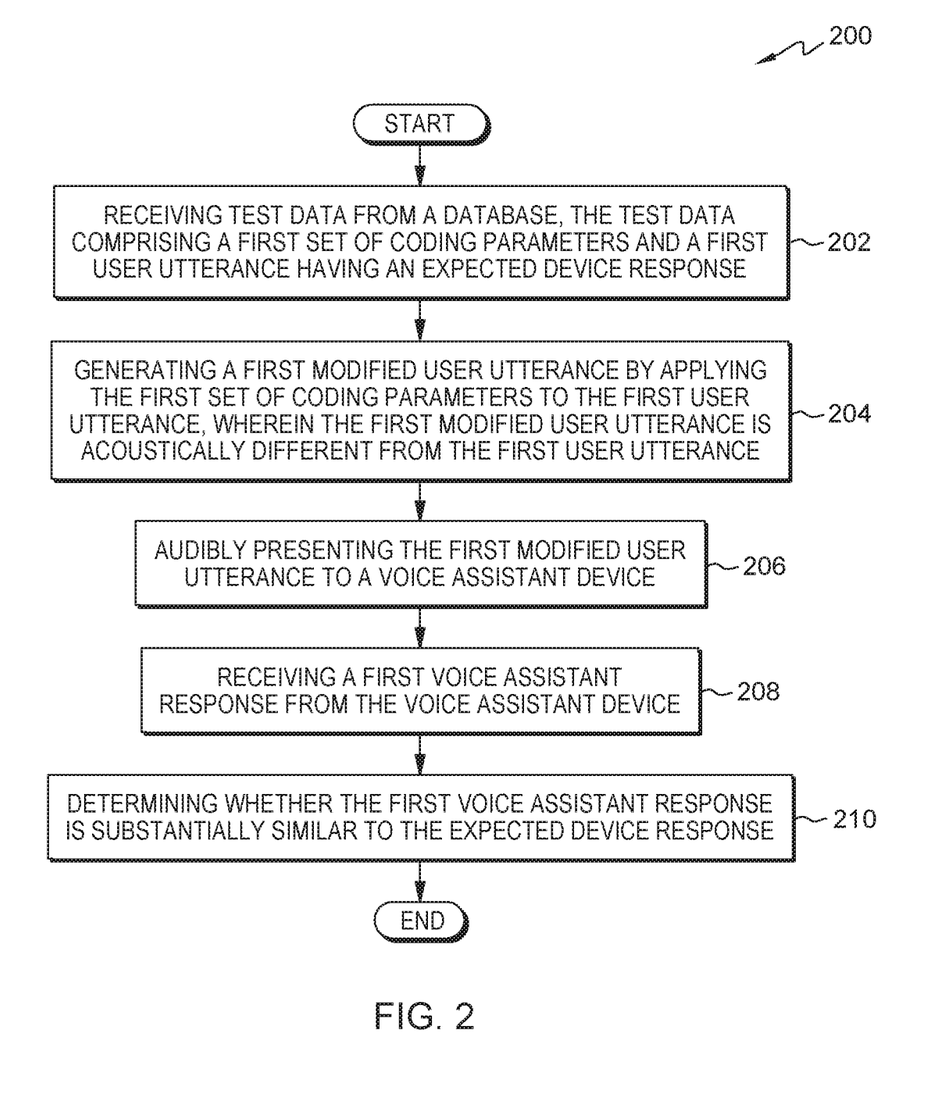
FIG. 2 is a flowchart depicting operational steps of a computer-implemented method for testing a voice assistant device, on a server computer within the distributed data processing environment of FIG. 1, in accordance with an embodiment of the present invention.

The computer-implemented method for testing a voice assistant device 120, is depicted and described in further detail with respect to FIG. 2.

FIG. 2 is a flowchart depicting operational steps of a computer-implemented method 200 for testing a voice assistant device within the distributed data processing environment of FIG. 1, in accordance with an embodiment of the present invention.

In an embodiment, computer-implemented method 200 for testing a voice assistant device may be executed by one or more processors configured for receiving 202 test data from a database, e.g., database 122, wherein the test data may include at least a first set of coding parameters and a first user utterance having an expected device response. For example, the one or more processors may include a vocoder 130 configured for receiving 202 test data from database 122 via a communications link between database 122 and vocoder 130. Vocoder 130 may include a data port configured to receive a data transmission and relay the data to a processor resident in vocoder 130 for further processing. The first set of coding parameters may be used to configure vocoder 130 settings, which may be used to modulate or modify the first user utterance.

The computer-implemented method 200 for testing a voice assistant device may include one or more processors further configured for generating 204 a first modified user utterance by applying the first set of coding parameters to the first user utterance, wherein the first modified user utterance is acoustically different from the first user utterance. For example, the one or more processors may include vocoder 130 configured for generating 204 the first modified user utterance by applying the first set of coding parameters to the first user utterance, as explained above herein. The first modified user utterance may be acoustically different from the first user utterance at least due to vocoder 130 applying of the first set of coding parameters to the first user utterance. Thus, first modified user utterance may sound different due to one or more of the sound characteristics being modified by vocoder 130.

The computer-implemented method 200 for testing a voice assistant device may include one or more processors further configured for audibly presenting 206 the first modified user utterance to voice assistant device 120. For example, vocoder 130 may include a speaker configured for outputting an audio signal including the first modified user utterance for detection by voice assistant device 120. Voice assistant device 120 may include a microphone configured for detecting and receiving audio signals as sound waves within proximity of the speaker of vocoder 130.

The computer-implemented method 200 for testing a voice assistant device may include one or more processors further configured for receiving 208 a first voice assistant response from voice assistant device 120. The one or more processors may be configured to receive the first voice assistant response via a voice-to-text module 140, wherein the VTT module 140 may include a microphone to detect and receive the first voice assistant response as an audio input signal, convert the audio input signal to text data, and transmit the text data to the one or more processors for further processing. For example, a microphone may be positioned within range of a speaker of voice assistant device 120 such that the microphone may detect output audio signals from voice assistant device 120's speaker. The microphone may be configured to transmit the detected audio signals to the one or more processors as data corresponding to the voice assistant response.

The computer-implemented method 200 for testing a voice assistant device may include one or more processors further configured for determining 210 whether the first voice assistant response is substantially similar to the expected device response. In an embodiment, the one or more processors may include the ML model 150 for determining 210 whether the first voice assistant is substantially similar to the expected device response. Further, the one or more processors may be configured to determine a first score based on a comparison between the first voice assistant response and the expected device response. For example, if the first voice assistant response substantially matches the expected device response, then the first score may be 1. In the alternative, if the first voice assistant response does not substantially match the expected device response, then the first score may be a 0. If the first score is a 0, then the one or more processors may determine that an edge case is identified including the first test data and the voice assistant response.

In another embodiment, responsive to determining the first voice assistant response is substantially similar to the expected device response, computer-implemented method 200 for testing a voice assistant device may include one or more processors further configured for ceasing to receive additional test data. Further, responsive to determining the first voice assistant response is not substantially similar to the expected device response, one or more processors may be configured for identifying a first edge case based at least on the first set of coding parameters and the first modified user utterance. The one or more processors may be further configured for determining a second set of coding parameters based on at least one of the first set of coding parameters, the first modified user utterance, and the first edge case.

Furthermore, the computer-implemented method 200 for testing a voice assistant device may include one or more processors further configured for generating a second modified user utterance by applying the second set of coding parameters to the first user utterance, wherein the second modified user utterance may be acoustically different than the first user utterance and the first modified user utterance. The one or more processors may be further configured for audibly presenting the second modified user utterance to voice assistant device 120, receiving a second voice assistant response from voice assistant device 120, determining whether the second voice assistant response is substantially similar to the expected device response. Further, responsive to determining the second voice assistant response is substantially similar to the expected device response, the one or more processors may be configured for ceasing to receive additional test data from database 122. For example, once the one or more processors determine that the voice assistant response is substantially similar to the expected device response corresponding to the first user utterance, the one or more processors may then be configured to cease receiving test data including the first user utterance. However, the one or more processors may be configured to proceed to receive test data including additional user utterances that are different from the first user utterance to continue the testing regimen.

In an embodiment, the first modified user utterance may be audibly presented to voice assistant device 120 by a speaker communicatively connected to the one or more processors (e.g., vocoder 130), wherein the speaker is configured to output modified user utterances as an audio signal.

In an embodiment, the first voice assistant response may be received from voice assistant device 120 by a microphone communicatively connected to the one or more processors (e.g., voice-to-text module 140) as an audio signal.

Figure 3:
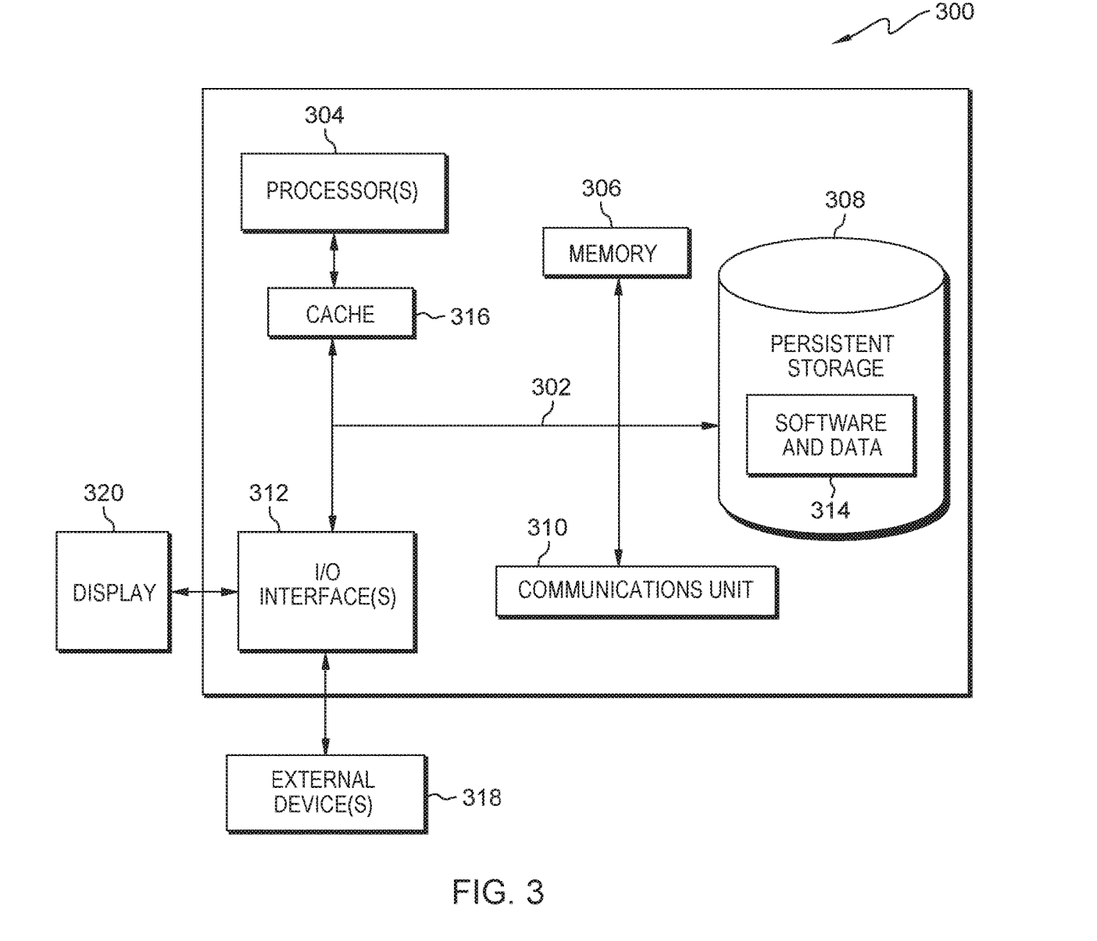
FIG. 3 depicts a block diagram of components of the server computer executing computer-implemented method for testing a voice assistant device within the distributed data processing environment of FIG. 1, in accordance with an embodiment of the present invention.

FIG. 3 depicts a block diagram of components of a server computer within distributed data processing environment 100 of FIG. 1, in accordance with an embodiment of the present invention. It should be appreciated that FIG. 3 provides only an illustration of one implementation and does not imply any limitations with regard to the environments in which different embodiments can be implemented. Many modifications to the depicted environment can be made.

FIG. 3 depicts a block diagram of computer 300 suitable for voice assistant device 120, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computer 300 includes communications fabric 302, which provides communications between cache 316, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses or a crossbar switch.

Memory 306 and persistent storage 308 are computer readable storage media. In this embodiment, memory 306 includes random access memory (RAM). In general, memory 306 can include any suitable volatile or non-volatile computer readable storage media. Cache 316 is a fast memory that enhances the performance of computer processor(s) 304 by holding recently accessed data, and data near accessed data, from memory 306.

Software and data 314 may be stored in persistent storage 308 and in memory 306 for execution and/or access by one or more of the respective computer processors 304 via cache 316. In an embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices. In these examples, communications unit 310 includes one or more network interface cards. Communications unit 310 may provide communications through the use of either or both physical and wireless communications links. Software and data 314 may be downloaded to persistent storage 308 through communications unit 310.

I/O interface(s) 312 allows for input and output of data with other devices that may be connected to voice assistant device 120. For example, I/O interface 312 may provide a connection to external devices 318 such as a keyboard, keypad, a touch screen, and/or some other suitable input device. External devices 318 can also include portable computer readable storage media such as, for example, thumb drives, portable optical or magnetic disks, and memory cards. Software and data 314 used to practice embodiments of the present invention can be stored on such portable computer readable storage media and can be loaded onto persistent storage 308 via I/O interface(s) 312. I/O interface(s) 312 also connect to a display 320.

Display 320 provides a mechanism to display data to a user and may be, for example, a computer monitor.

The present invention may contain various accessible data sources, such as database 122, that may include personal data, content, or information the user wishes not to be processed. Personal data includes personally identifying information or sensitive personal information as well as user information, such as tracking or geolocation information. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Software and data 314 may enable the authorized and secure processing of personal data. Software and data 314 may be configured to provide informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. Software and data 314 may provide information regarding personal data and the nature (e.g., type, scope, purpose, duration, etc.) of the processing. Software and data 314 provide the user with copies of stored personal data. Software and data 314 allow the correction or completion of incorrect or incomplete personal data. Software and data 314 allow the immediate deletion of personal data.

The computer-implemented methods described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a computer-implemented method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for testing a voice assistant device, the computer-implemented method comprising:
   receiving, by one or more processors, test data from a database, the test data comprising a first set of coding parameters and a first user utterance having an expected device response, wherein the first set of coding parameters comprises one or more trigger words and one or more associated device responses;
   generating, by the one or more processors, a first modified user utterance by applying the first set of coding parameters to the first user utterance, wherein the first modified user utterance is acoustically different than the first user utterance;
   audibly presenting, by the one or more processors, the first modified user utterance to the voice assistant device;
   receiving, by the one or more processors, a first voice assistant response from the voice assistant device;
   determining, by the one or more processors, that the first voice assistant response is substantially similar to the expected device response;
   responsive to determining the first voice assistant response is not substantially similar to the expected device response, identifying, by the one or more processors, a first edge case based at least on the first set of coding parameters and the first modified user utterance; and
   determining, by the one or more processors, a second set of coding parameters based on at least one of the first set of coding parameters, the first modified user utterance, and the first edge case.

2. The computer-implemented method of claim 1, further comprising:
   responsive to determining the first voice assistant response is substantially similar to the expected device response, ceasing to receive, by the one or more processors, additional test data.

3. The computer-implemented method of claim 1, further comprising:
   generating, by the one or more processors, a second modified user utterance by applying the second set of coding parameters to the first user utterance, wherein the second modified user utterance is acoustically different than the first user utterance and the first modified user utterance;
   audibly presenting, by the one or more processors, the second modified user utterance to the voice assistant device;
   receiving, by the one or more processors, a second voice assistant response;
   determining, by the one or more processors, whether the second voice assistant response is substantially similar to the expected device response; and
   responsive to determining the second voice assistant response is substantially similar to the expected device response, ceasing to receive additional test data comprising the first user utterance.

4. The computer-implemented method of claim 1, wherein the first modified user utterance is audibly presented to the voice assistant device by a speaker communicatively connected to the one or more processors, the speaker configured for outputting the first modified user utterance as a first audio signal.

5. The computer-implemented method of claim 1, wherein the first voice assistant response received from the voice assistant device is detected by a microphone communicatively connected to the one or more processors as a second audio signal.

6. A computer program product for testing a voice assistant device, the computer program product comprising:
   one or more computer readable storage media and program instructions collectively stored on the one or more computer readable storage media, the stored program instructions comprising:
      program instructions to receive test data from a database, the test data comprising a first set of coding parameters and a first user utterance having an expected device response, wherein the first set of coding parameters comprises one or more trigger words and one or more associated device responses;
      program instructions to generate a first modified user utterance by applying the first set of coding parameters to the first user utterance, wherein the first modified user utterance is acoustically different than the first user utterance;
      program instructions to audibly present the first modified user utterance to the voice assistant device;
      program instructions to receive a first voice assistant response from the voice assistant device;
      program instructions to determine that the first voice assistant response is substantially similar to the expected device response;
      responsive to determining the first voice assistant response is not substantially similar to the expected device response, program instructions to identify a first edge case based at least on the first set of coding parameters and the first modified user utterance; and
      program instructions to determine a second set of coding parameters based on at least one of the first set of coding parameters, the first modified user utterance, and the first edge case.

7. The computer program product of claim 6, further comprising:
   responsive to determining the first voice assistant response is substantially similar to the expected device response, program instructions to cease receiving additional test data.

8. The computer program product of claim 6, further comprising:
   program instructions to generate a second modified user utterance by applying the second set of coding parameters to the first user utterance, wherein the second modified user utterance is acoustically different than the first user utterance and the first modified user utterance;
   program instructions to audibly present the second modified user utterance to the voice assistant device;
   program instructions to receive a second voice assistant response;
   program instructions to determine whether the second voice assistant response is substantially similar to the expected device response; and
   responsive to determining the second voice assistant response is substantially similar to the expected device response, program instructions to cease receiving additional test data comprising the first user utterance.

9. The computer program product of claim 6, wherein the first modified user utterance is audibly presented to the voice assistant device by a speaker communicatively connected to the one or more processors, the speaker configured for outputting the first modified user utterance as a first audio signal.

10. The computer program product of claim 6, wherein the first voice assistant response received from the voice assistant device is detected by a microphone communicatively connected to the one or more processors as a second audio signal.

11. A computer system for testing a voice assistant device, the computer system comprising:
- one or more computer processors;
- one or more computer readable storage media;
- program instructions collectively stored on the one or more computer readable storage media for execution by at least one of the one or more computer processors, the stored program instructions comprising:
  - program instructions to receive test data from a database, the test data comprising a first set of coding parameters and a first user utterance having an expected device response, wherein the first set of coding parameters comprises one or more trigger words and one or more associated device responses;
  - program instructions to generate a first modified user utterance by applying the first set of coding parameters to the first user utterance, wherein the first modified user utterance is acoustically different than the first user utterance;
  - program instructions to audibly present the first modified user utterance to the voice assistant device;
  - program instructions to receive a first voice assistant response from the voice assistant device;
  - program instructions to determine that the first voice assistant response is substantially similar to the expected device response;
  - responsive to determining the first voice assistant response is not substantially similar to the expected device response, program instructions to identify a first edge case based at least on the first set of coding parameters and the first modified user utterance; and
  - program instructions to determine a second set of coding parameters based on at least one of the first set of coding parameters, the first modified user utterance, and the first edge case.

12. The computer system of claim 11, further comprising:
- responsive to determining the first voice assistant response is substantially similar to the expected device response, program instructions to cease receiving additional test data.

13. The computer system of claim 11, further comprising:
- program instructions to generate a second modified user utterance by applying the second set of coding parameters to the first user utterance, wherein the second modified user utterance is acoustically different than the first user utterance and the first modified user utterance;
- program instructions to audibly present the second modified user utterance to the voice assistant device;
- program instructions to receive a second voice assistant response;
- program instructions to determine whether the second voice assistant response is substantially similar to the expected device response; and
- responsive to determining the second voice assistant response is substantially similar to the expected device response, program instructions to cease receiving additional test data comprising the first user utterance.

14. The computer system of claim 11, wherein the first modified user utterance is audibly presented to the voice assistant device by a speaker communicatively connected to the one or more processors, the speaker configured for outputting the first modified user utterance as a first audio signal, and wherein the first voice assistant response received from the voice assistant device is detected by a microphone communicatively connected to the one or more processors as a second audio signal.

* * * * *